United States Patent [19]

Blechinger et al.

[11] Patent Number: 4,776,213

[45] Date of Patent: Oct. 11, 1988

[54] MASS AIRFLOW METER

[75] Inventors: Chester J. Blechinger, Bloomfield Hills; Shaun L. McCarthy, Ann Arbor, both of Mich.

[73] Assignee: Ford Motor Company, Dearborn, Mich.

[21] Appl. No.: 27,479

[22] Filed: Mar. 18, 1987

[51] Int. Cl.[4] .................................................. G01F 1/68
[52] U.S. Cl. ..................................... 73/202; 73/118.2; 73/204.11
[58] Field of Search .................... 73/202, 204, 861.61, 73/861.62, 861.63, 861.64, 861.35, 118.2

[56] References Cited

U.S. PATENT DOCUMENTS

| 2,512,278 | 6/1950 | Jones | 73/182 |
|---|---|---|---|
| 3,777,563 | 12/1973 | Yamasaki et al. | 73/204 |
| 3,818,758 | 6/1974 | Easter | 73/204 |
| 4,213,335 | 7/1980 | Peter et al. | 73/204 |
| 4,232,549 | 11/1980 | Migrin et al. | 73/202 |
| 4,279,146 | 7/1981 | Wessel et al. | 73/204 |
| 4,393,697 | 7/1983 | Sato et al. | 73/204 |
| 4,412,449 | 11/1983 | Eiermann et al. | 73/204 |
| 4,420,972 | 12/1983 | Kuroiwa et al. | 73/202 |
| 4,433,576 | 2/1984 | Shih et al. | 73/204 |
| 4,434,656 | 3/1984 | Blechinger | 73/204 |
| 4,445,369 | 5/1984 | Stoltman et al. | 73/204 |
| 4,448,064 | 5/1984 | Asayama | 73/118.2 |
| 4,457,169 | 7/1984 | Lauterbach et al. | 73/202 |
| 4,468,963 | 9/1984 | Schauble | 73/204 |
| 4,494,405 | 1/1985 | Oosuga et al. | 73/204 |
| 4,517,837 | 5/1985 | Oyama et al. | 73/118.2 |
| 4,571,996 | 2/1986 | Wakeman et al. | 73/202 |
| 4,624,138 | 11/1986 | Ono et al. | 73/204 |
| 4,709,581 | 12/1987 | Nishimura et al. | 73/202 |

Primary Examiner—Joseph A. Orsino
Assistant Examiner—Brent A. Swarthout
Attorney, Agent, or Firm—Allan J. Lippa; Peter Abolins

[57] ABSTRACT

A mass airflow meter for positioning within a duct wherein a fluid flows, particularly an air intake of an internal combustion engine, includes a symmetrical body having an axial passageway and a radial passageway. The radial passageway has a temperature dependent element positioned therein and extends from the axial passageway at an acute angle to the downstream flow of air. Accordingly, the radial passageway provides inertial separation of airborne particulate and also provides isolation from air flowing backwards through the air intake.

10 Claims, 2 Drawing Sheets

MASS AIRFLOW METER

BACKGROUND OF THE INVENTION

The invention relates to an apparatus for the measurement of fluid flow. More particularly, the invention relates to a mass airflow meter wherein the electrical properties of a temperature dependent element vary in proportion to the mass of air flowing across the element.

Mass airflow meters containing temperature dependent elements are known for providing an electrical measurement of the mass of air inducted into an internal combustion engine. In one approach, a temperature dependent element such as a resistive wire is electrically heated by passing electrical current therethrough to maintain a substantially constant temperature. Since the current drawn by the wire varies with the mass of cooling air flowing across the wire, a measurement of the current provides a measurement of the airflow. A problem with the hot wire approach is that airborne particulate striking the wire will eventually change its resistance, and therefore its measuring accuracy, due to such factors as erosion and accumulation of particulate residue.

Various solutions to the problems caused by airborne particulate have been tried. For example, U.S. Pat. No. 4,412,449, to Eirmann, discloses placing a protective screen upstream of a temperature dependent element to shield the element from the particulate. In another approach, U.S. Pat. No. 4,213,335, to Peter et al, discloses a temperature dependent element having a geometry wherein the surfaces opposing the airflow are small in area when compared to surfaces lying substantially in the direction of the airflow. It is alleged that less particulate will strike the opposing surface than the parallel surfaces. Still another approach is disclosed in U.S. Pat. No. 4,457,169, to Lauterbach et al, wherein a temperature dependent resistor is disposed in a gap extending parallel to the airflow, and a deflecting body bridging that gap is disposed upstream of the gap. The spacing between the deflecting body and the gap defines two inlet conduits which discharge into the gap at an acute angle. The inertia of the airborne particulate impedes the particulate from turning into the gap.

A disadvantage with all of the above approaches is that protection against airborne particulate is provided in only one direction of airflow, protection is not provided during conditions of either backflow or backfire. When a backflow occurs, such as during low speed and high load operation, air will flow backwards across the temperature dependent element without first passing across a screen or a deflecting body. The temperature dependent element will therefore be exposed to airborne particulate. In addition, the backflow will be erroneously measured as intake air unless additional apparatus is employed to correct for the measurement of backflow. Similarly, when an engine backfire occurs, the temperature dependent element will be exposed to both airborne particulate and soot from the engine.

An approach to deal with the backflow problem is disclosed in both U.S. Pat. No. 4,420,972, to Kuroiwa et al and U.S. Pat. No. 4,494,405, to Oosuga et al, which show a bypass air passageway communicating with the main inducted air passageway. The geometry of the passageway is configured to separate particulate from the temperature dependent element. A disadvantage of this approach, however, is that the bypass geometry will also cause air turbulance resulting in a poor signal-to-noise ratio for the mass airflow meter.

There still remain the above problems of reducing particulate deposition on a temperature dependent element, isolating the element from both backflow and backfire, and providing an airflow across the element with minimal fluctuations in velocity or turbulence. None of the uncovered prior approaches provides a solution to all of these problems. It would be advantageous to develop an airflow meter which is sufficiently accurate in a relatively dirty environment to be used as part of an engine control apparatus for an automobile. These are some of the problems this invention overcomes.

DISCLOSURE OF INVENTION

In accordance with the preferred embodiment of this invention, an apparatus for sensing the flow of air through a duct includes a body or housing positioned within an air inlet duct having an outer surface symmetrical about its axis and tapered towards both axial ends. The geometry of the body is similiar to an air foil thereby minimizing the introduction of air turbulence into the air duct. The body includes an axial passageway for positioning in a direction parallel to the airflow through the duct, a first radial passageway, and a second radial passageway, each of the radial passageways extending at an acute angle from the axial passageway to the outer surface, the radial passageways being symmetrically positioned about the axial passageway, and means positioned in the first radial passageway for sensing the flow of air therethrough.

The angular or oblique positioning of the radial passageways with respect to both the axial passageway and outer surface of the body provides inertial separation of airborne particulate and also prohibits backflow air from entering the radial passageways. In addition, the symmetrical positioning of the radial passageways and geometry of the body avoids possible sources of disturbances to the airflow through the duct which would reduce the signal-to-noise ratio of the sensing means.

BEST MODE FOR CARRYING OUT INVENTION

Figure 1:
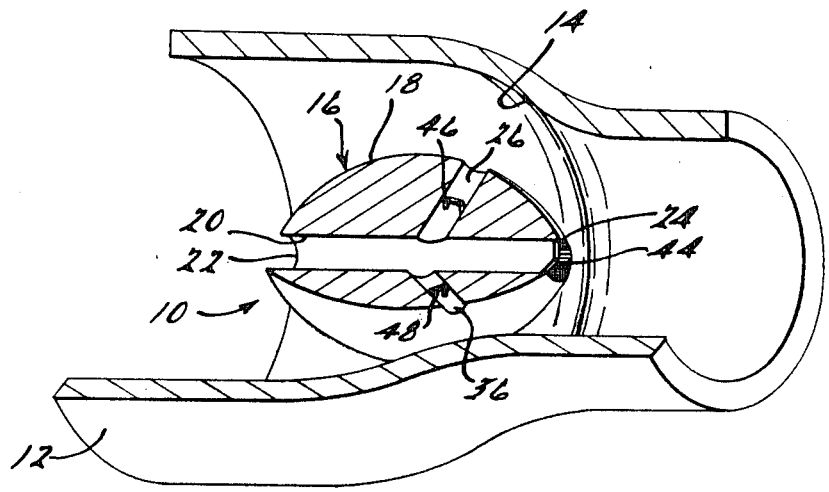
FIG. 1 is a perspective, cut away view of an airflow meter positioned within an air duct in accordance with an embodiment of this invention.

Referring first to FIG. 1, an airflow meter 10 is shown positioned within an air duct 12, such as an air intake to an internal combustion engine, in a direction substantially parallel to the flow of air therethrough. A strut 8 (not shown) extends from the inner wall of duct 12 to meter 10 for positioning meter 10. Preferably, meter 10 is positioned with respect to restriction 14 of duct 12 such that a portion of outer surface 18 is substantially parallel to restriction 14. Accordingly, air is directed between restriction 14 and outer surface 18 in a direction substantially parallel to outer surface 18 for reasons described hereinafter.

Figure 2:
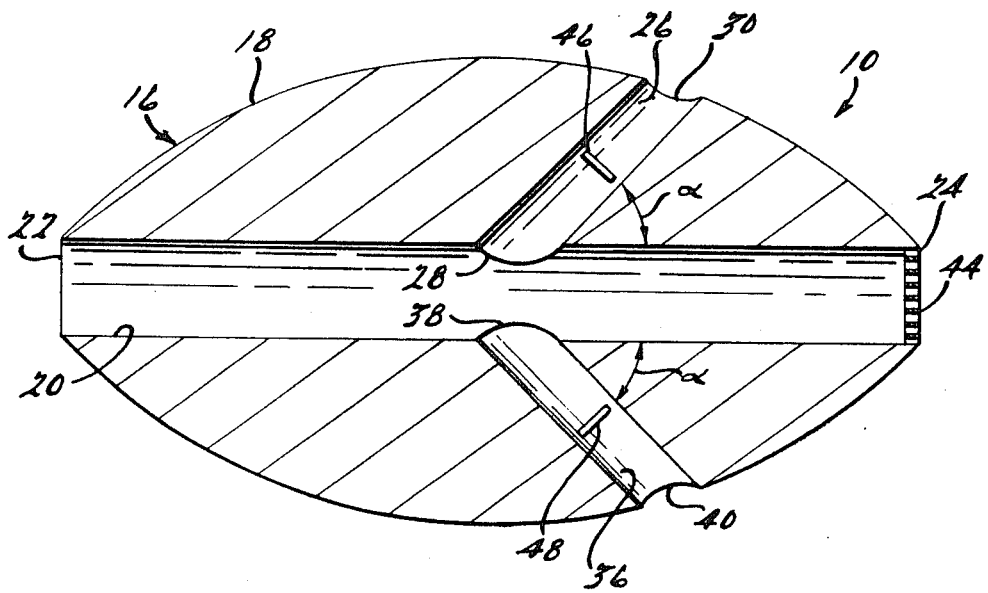
FIG. 2 is a cross sectional view of the airflow meter.

Referring now to FIGS. 1 and 2, meter 10 includes a body 16 having the general shape of an airfoil. More specifically, the outer surface 18 of body 16 is symmetrical about its axis and tapered towards both axial ends. An axial passageway 20 extending through body 16 has a diameter $D_1$, length $L_1$, inlet end 22, and outlet end 24. Radial passageway 26, having inlet end 28 of diameter $D_2$, outlet end 30 of diameter $D_3$, and length $L_2$, extends from axial passageway 20 to outer surface 18 in a direction forming an acute angle alpha to the downstream flow of air through axial passageway 20. Radial passageway 26 is substantially perpendicular to outer surface 18 at outlet 26. Substantially identical radial passageway 36, having inlet end 38 of diameter $D_4$, outlet end 40 of diameter $D_5$, and length $L_4$, extends from axial passageway 20 to outer surface 18 in a direction also forming acute angle alpha to the downstream flow of air through axial passageway 20. Radial passageway 36 is also substantially perpendicular to outer surface 18 at outlet 36. Radial passageway 26 and radial passageway 36 are of substantially the same geometry, and each is symmetrically positioned about axial passageway 20 for reasons described hereinafter.

Continuing with FIG. 2, calibration means or variable restriction 44 is shown positioned in outlet end 24 of axial passageway 20. Variable restriction 44 may be manually adjusted to determine the proportion of air from axial passageway 20 which enters both radial passageway 26 and radial passageway 36. Temperature dependent element 46, preferably a conventional heated wire, is positioned within radial passageway 26. Element 46 is coupled to conventional electrical circuitry (not shown) for providing a signal proportional to the cooling mass of airflow across element 46. A second temperature dependent element 48 is shown positioned within radial passageway 36. Second element 48 is also coupled to the above referenced electrical circuitry for providing the circuitry with a measurement of air temperature. Those skilled in the art will recognize that the air temperature measurement may be used to compensate for changes in the electrical characteristics of element 46 which are caused by changes in air temperature rather than the mass of airflow. Thus, a more accurate measurement of airflow is obtained.

Referring particularly to FIG. 2, radial passageway 26 and radial passageway 36 are inwardly tapered from their respective inlet diameters $D_2$ and $D_4$ to their respective outlet diameters $D_3$ and $D_5$. The tapering provides a pressure drop and velocity increase of airflow thereby reducing velocity fluctuations within a cross sectional area of the radial passageway. Accordingly, the airflow across temperature dependent element 46 is forced to be substantially uniform, thereby enhancing the signal to noise ratio obtained by element 46. The tapering provides a more uniform velocity profile under conditions of either laminar airflow or turbulent airflow. It has been determined that in the case of turbulent airflow through duct 12, velocity fluctuations within a cross sectional area of radial passageway 26 are substantially reduced when the ratio of $D_3/D_2$ is less than or equal to 0.9.

Figure 3:
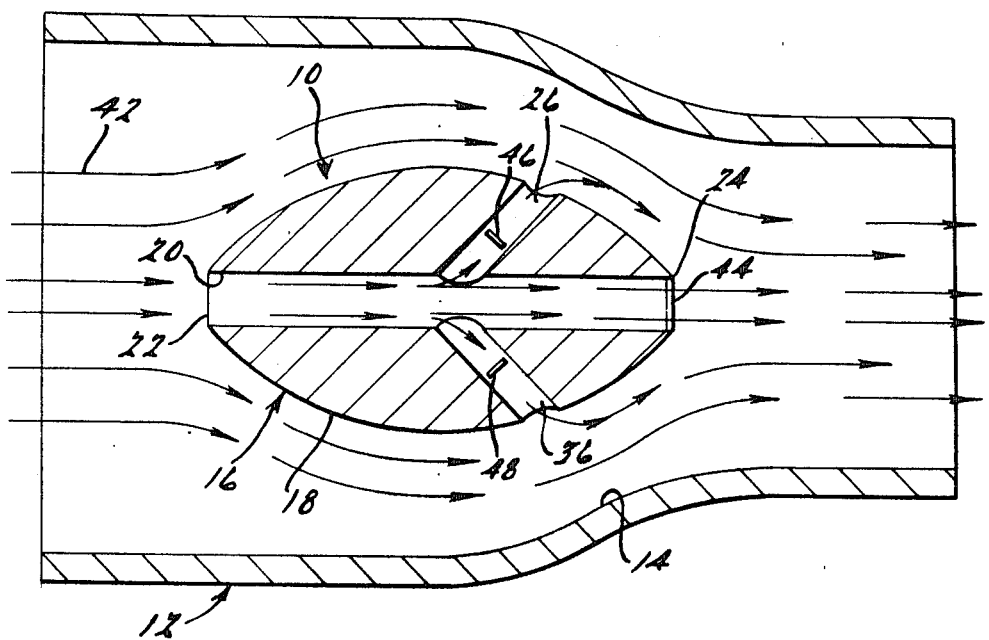
FIG. 3 is a cross sectional view of the airflow meter in the air duct showing airstream lines to illustrate the operation of the meter.

The operation of meter 10 is now described with particular reference to FIG. 3 under conditions of laminar airflow through duct 12. Although laminar airflow is illustrated by air stream lines 42, the invention may be used to advantage under conditions of turbulent airflow through duct 12. In operation, a portion of the air inducted through axial passageway 20 is drawn through both radial passageway 26 and radial passageway 36 as determined by the setting of variable restriction 44. However, particulate contained in the air inducted through passageway 20 is not drawn through the radial passageways because inertia prevents the particulate from turning through an angle (180° − alpha) into either of the radial passageways. Temperature dependent element 46 is therefore not subject to impairment of accuracy and longevity which would otherwise result if the particulate was not inertially separated.

Besides inertial separation of particulate, the airfoil geometry of body 16 and the symmetrical positioning of the radial passageways facilitate a symmetrical airflow around flowmeter 10 as illustrated by streamlines 42. Thus, abrupt perturbations in airflow are not introduced into duct 12 which would otherwise cause unwanted variations in the electrical measurements of element 46. Stated another way, avoidance of air perturbations increases the signal-to-noise ratio of airflow meter 10.

During conditions of backflow or backfire, air flowing backwards through duct 12 around outer surface 18 is unable to enter radial passageway 26 or radial passageway 36 because the air would have to turn approximately 90°. Similarly, air flowing backwards through axial passageway 20 is unable to turn (90°+alpha) to enter either radial passageway 26 or radial passageway 36. Accordingly, only a negligible amount of air will flow across temperature dependent element 46 during conditions of either backflow or backfire. Airflow meter 10 will therefore not provide an erroneous measurement of backflowing air as input air. Further, element 46 will be isolated from airborne particulate and engine soot during both backflow and backfire conditions.

Figure 4:
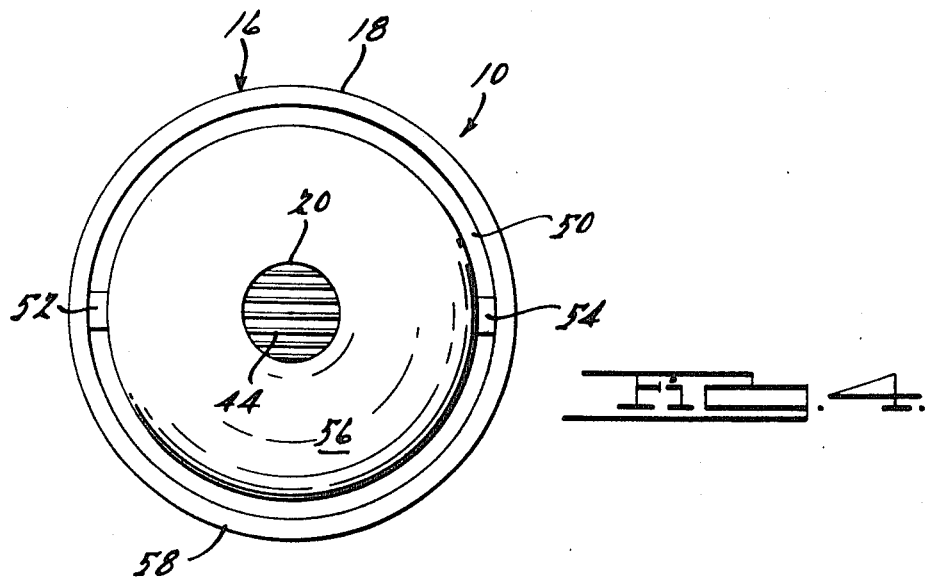
FIG. 4 is an elevation view of the downstream end of another airflow meter in accordance with an alternate embodiment of this invention.

Having described a preferred embodiment of the invention, an alternate embodiment is now described wherein the invention may be used to advantage. Referring to FIG. 4, an elevation view of the downstream end of meter 10 is illustrated having angularly disposed, conical passageway 50 symmetrically positioned about axial passageway 20. The single conical passageway 50 replaces both radial passageway 26 and radial passageway 36 which are illustrated in FIGS. 1-3. Strut 52 and strut 54 are shown for aligning segment 56 to segment 58 of body 16.

Various modifications and variations will no doubt occur to those skilled in the arts to which this invention pertains. For example, the particular shape of body 16 of flowmeter 10 may be varied from that disclosed herein. More specifically, a rectangular body 10 having an axial passageway and radial passageways symmetrically positioned about the axial passageway may be used to advantage. These and all other variations which basically rely on the teachings through which this disclosure has advanced the art are properly considered within the scope of this invention.

We claim:

1. An apparatus housing a temperature dependent element for measuring airflow through a duct wherein deposition of airborne particulate on the temperature dependent element is prevented in both downstream and upstream directions of airflow through the duct, said apparatus comprising:
   a body positioned in said duct having an outer surface symmetrical about its axis and tapered towards both axial ends, said body including an axial passageway therethrough;

a radial passageway positioned in said body having an inlet end connected to said axial passageway and an outlet end connected to said outer surface, said radial passageway forming an acute angle to said axial passageway downstream of said inlet end so that airborne particulate flowing downstream through said axial passageway is prevented from turning into said inlet end and airborne particulate flowing upstream through said axial passageway is prevented from turning into said inlet end and airborne particulate flowing upstream through said duct around said outer surface is prevented from turning into said outlet end; and said temperature dependent element being positioned in said radial passageway.

2. The apparatus recited in claim 1, wherein said radial passageway intersects said outer surface in a direction substantially perpendicular to said outer surface.

3. The apparatus recited in claim 1, further including means coupled to said axial passageway for adjusting the portion of air entering said radial passageway from said axial passageway.

4. The apparatus recited in claim 1, wherein said radial passageway is inwardly tapered from said axial passageway to said outer surface.

5. An apparatus housing a pair of temperature dependent elements for measuring airflow through a duct wherein deposition of airborne particulate on the temperature dependent elements is prevented in both downstream and upstream directions of airflow through the duct, said apparatus comprising:

a body positioned in said duct having an outer surface symmetrical about its axis and tapered towards both axial ends, said body including an axial passageway therethrough;

a first radial passageway and a second radial passageway positioned in said body, each of said passageways having an inlet end connected to said axial passageway and an outlet end connected to said outer surface, each of said radial passageways forming an acute angle to said axial passageway downstream of said inlet end so that airborne particulate flowing downstream through said axial passageway is prevented from turning into said inlet end and airborne particulate flowing upstream through said axial passageway is prevented from turning into said inlet end and airborne particulate flowing upstream through said duct around said outer surface is prevented from turning into said outlet end; and each of said temperature dependent elements being positioned in one of said radial passageways.

6. The apparatus recited in claim 5, wherein said first radial passageway and said second radial passageway intersect said outer surface in a substantially perpendicular direction to said outer surface.

7. The apparatus recited in claim 5, further including means positioned in said second radial passageway for sensing the temperature of air therein.

8. The apparatus recited in claim 5, wherein said first radial passageway is inwardly tapered from said axial passageway to said outer surface.

9. The apparatus recited in claim 5, wherein the ratio of the outlet to the inlet diameters of said first radial passageway is less than 0.9.

10. An apparatus housing a temperature dependent element for measuring airflow through a duct wherein deposition of airborne particulate on the temperature dependent element is prevented in both downstream and upstream directions of airflow through the duct, said apparatus comprising:

a body positioned in said duct having an outer surface symmetrical about its axis and tapered towards both axial ends, said body including an axial passageway therethrough;

a conical passageway positioned in said body having an inlet end connected to said axial passageway and an outlet end connected to said outer surface, said axial passageway forming an acute angle to said conical passageway downstream of said inlet end so that airborne particulate flowing downstream through said axial passageway is prevented from turning into said inlet end and airborne particulate flowing upstream through said axial passageway is prevented from turning into said inlet end and airborne particulate flowing upstream through said duct around said outer surface is prevented from turning into said outlet end; and said temperature dependent element being positioned in said conical passageway.

* * * * *